J. W. PITTOCK.
CENTRIFUGAL MACHINE FOR SEPARATING OIL FROM CHIPS.
APPLICATION FILED OCT. 14, 1918.
1,340,682.
Patented May 18, 1920.
2 SHEETS—SHEET 1.
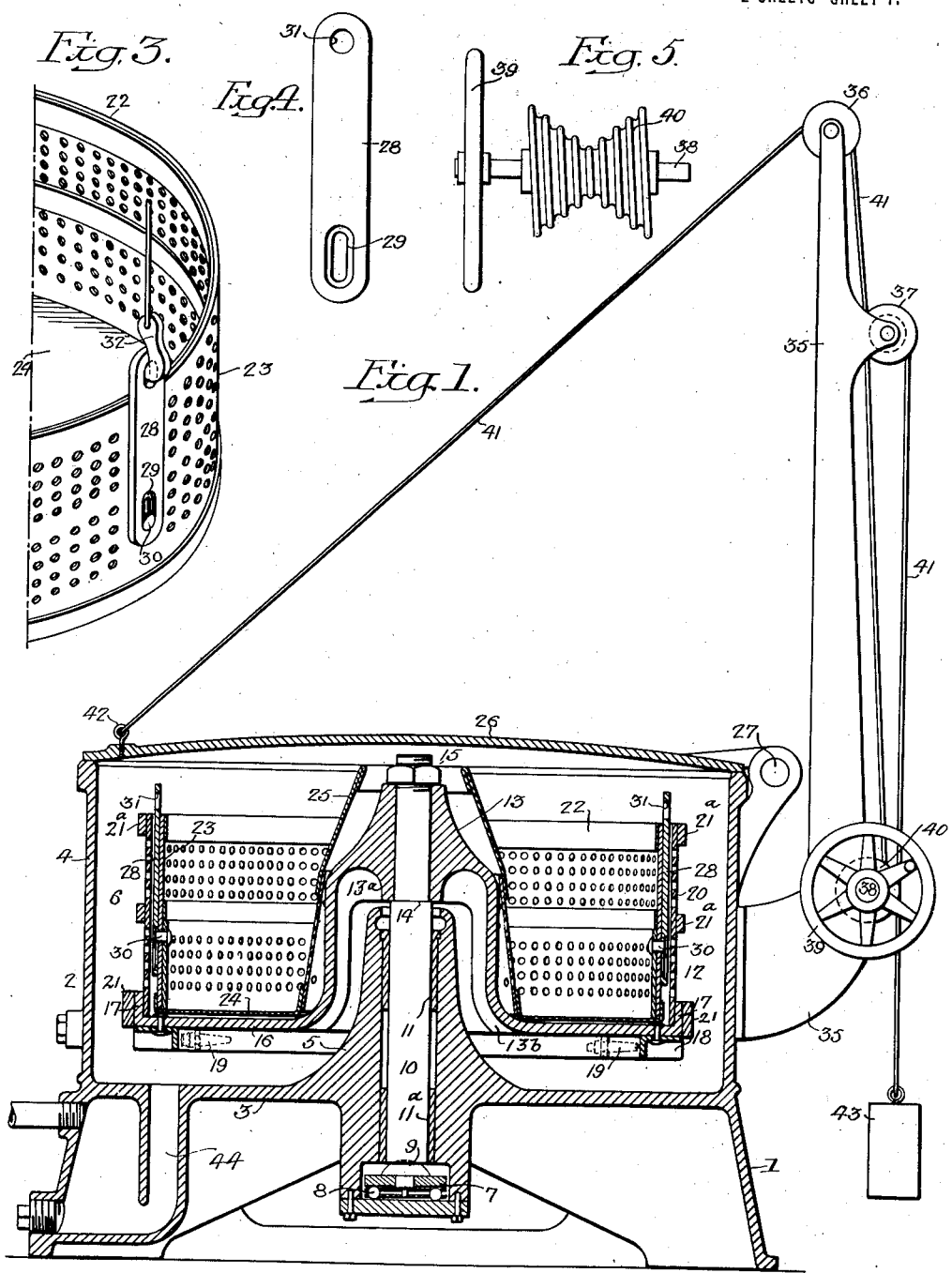
Inventor
John W. Pittock,
by his Attorneys.

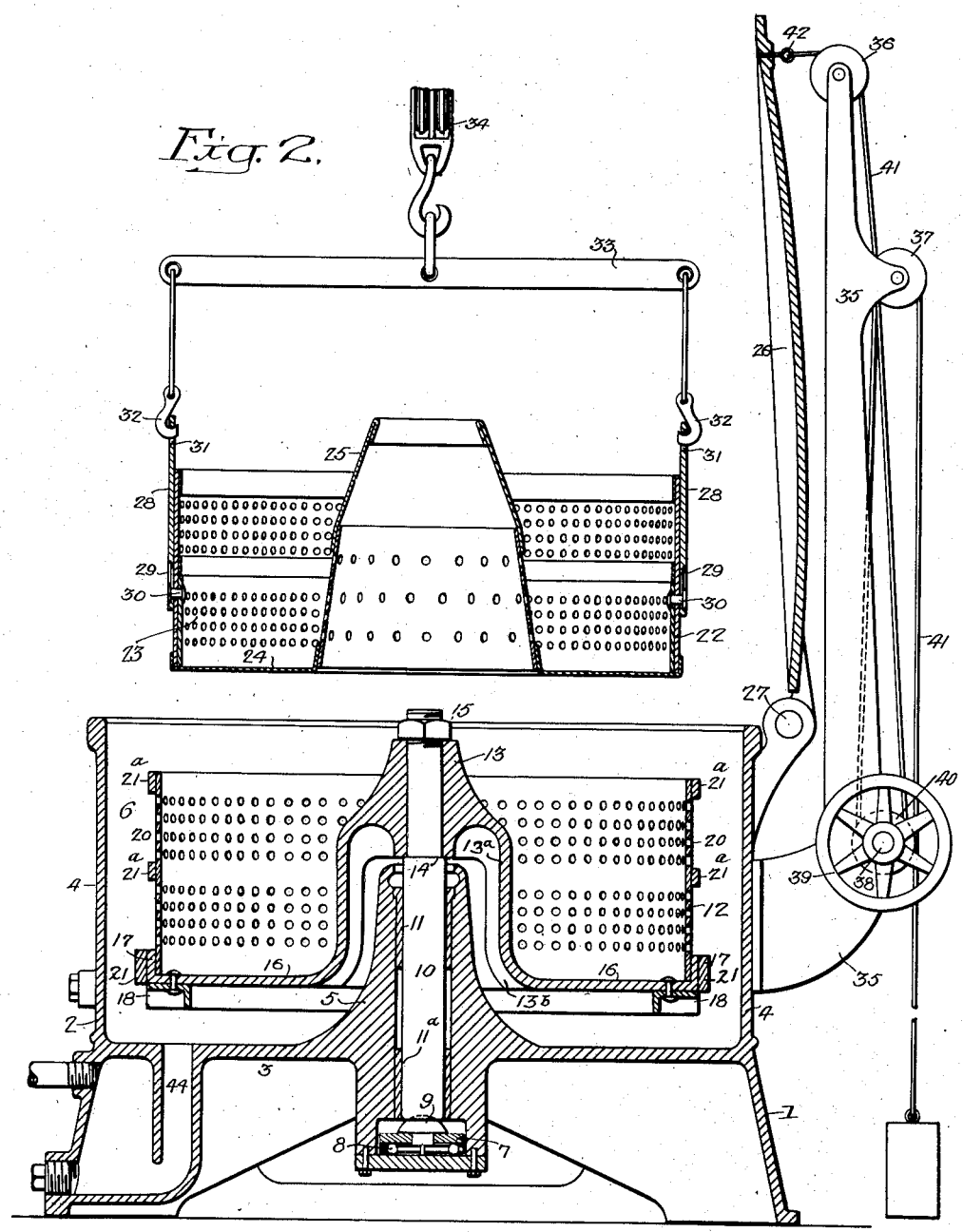

UNITED STATES PATENT OFFICE.

JOHN W. PITTOCK, OF PHILADELPHIA, PENNSYLVANIA.

CENTRIFUGAL MACHINE FOR SEPARATING OIL FROM CHIPS.

1,340,682.	Specification of Letters Patent.	Patented May 18, 1920.

Application filed October 14, 1918. Serial No. 257,950.

*To all whom it may concern:*

Be it known that I, JOHN W. PITTOCK, a citizen of the United States, residing in Philadelphia, Pennsylvania, have invented certain Improvements in Centrifugal Machines for Separating Oil from Chips, of which the following is a specification.

This invention relates to certain improvements in machines of the type in which a basket is rapidly rotated within an inclosed casing, the material to be acted on being loaded in the basket. The basket is driven by one or more steam jets playing upon the blades on the lower portion of the basket.

One object of my invention is to construct the casing and the central post in one piece with the supporting structure so as to make the parts rigid and to avoid leakage, which usually occurs where the casing and the base are made separate from the supporting structure and secured thereto by bolts, or other fastenings.

A further object of the invention is to provide means for readily discharging the material from the basket when the basket is raised clear of the casing.

In the accompanying drawings:—

Figure 1, is a sectional elevation showing my improved machine with the basket within the casing and the lid closed;

Fig. 2, is a sectional elevation, similar to Fig. 1, with the lid raised and the basket removed from the casing and suspended ready for tipping;

Fig. 3, is a detached perspective view of a portion of the basket, showing one of the bails;

Fig. 4, is a detached view of one of the bails; and

Fig. 5, is a detached view of the spiral drum around which the lid operating rope passes.

Referring to the drawings, 1 is the base of the machine. 2 is the casing having a solid bottom 3 and a cylindrical side section 4. 5 is the post extending up into the chamber 6 formed in the casing and extending down to form the support for the step bearing 7. These several parts are made in a single casting, doing away with all bolts. or other fastenings, and all machine joints, making the casing substantial and capable of resisting the strains to which it is subjected.

The step bearing 7, in the present instance, has a rounded step 9 supporting the shaft 10 and carried by a ball bearing 8. The post extends to a point above the center of gravity so that the cage, with the basket, can be run without a balancing device, and within the post are two sleeves 11 and 11$^a$ spaced apart as shown and forming bearings for the shaft 10.

12 is the cage having a hub 13 which is mounted on the upper end of the shaft 10 and held to a shoulder 14 on the shaft by a nut 15. The extension 13$^a$ of the hub is clear of the post 5 and has strengthening ribs 13$^b$ and is integral with the bottom 16 which has a flange 17 at its outer edge. In the present instance secured to the bottom near the outer edge is a series of vanes 18 against which the steam is projected from the nozzles 19, which cause the cage to rotate rapidly. The steam escaping from the nozzles circulates within the chamber 6. The hub 13 and bottom 16 are made in a single casting and located within the flange 17 is the perforated side member 20. A heavy band 21 is secured to the flange 17 and other bands 21$^a$ are secured to the perforated side member.

22 is the basket in which the metallic chips or other material to be treated are placed, and this basket has a cylindrical shell 23 perforated as shown, a solid bottom 24, and a central hollow extension 25, which is preferably perforated and which incloses the hub 13 and extends above the upper edge of the basket, as clearly shown in Fig. 1.

26 is a lid which rests on the casing. This lid is pivoted at 27. Suitable means, hereinafter described, are provided for raising and lowering this lid, which is comparatively heavy.

In order to provide means for readily handling the basket with the chips therein, I locate, at opposite sides of the basket, bails 28; the lower ends of these bails being slotted, as at 29, and countersunk as shown. Headed pivot pins 30 secured to the basket extend through the slots 29 and the heads of the pins are located in the counter sunk portions so that they will be flush with the bails. In the upper end of each bail is a perforation 31 for a hook 32, hung from a bar 33, which is carried by a block and tackle 34 of a hoist. The pivot pins 30 are so located that they will hold the lowered basket in an upright position while the basket is being moved from one point to another, but the basket can be readily tipped so as to discharge the contents. It will be understood that metallic chips are very difficult to handle, but by upsetting the basket manual labor is avoided.

Secured to one side of the casing 4 is a standard 35, carrying at its upper end a grooved pulley 36, and a short distance below this is a pulley 37. At the base of the standard is a shaft 38 having a hand wheel 39, and on the shaft is a spiral drum 40. A rope 41 is attached to the lid 26 at 42 and passes around the grooved pulley 36 and then around the spiral drum one or more times, then up and around the pulley 37, and at the lower end of this rope is a weight 43 which keeps the rope taut. When the lid is down the rope is on the smallest diameter of the drum, while the rope for the counterweight is on the large diameter. By this means the lid can be readily opened or closed by hand.

By making the casing, foundation and post of an integral casting and putting heavy fillets where the post joins the base and using an extremely heavy shaft, I am enabled to carry very heavy loads, and furthermore by making the basket in the manner shown, in which the central extension has a series of ribs, and by providing a heavy ring at the periphery near the base of the basket, metallic chips can be loaded in the basket and rotated rapidly without the necessity of providing balancing devices for the basket, which heretofore were thought necessary.

The operation of the machine is as follows:—The machine is especially adapted for separating oil from metallic chips, which are cuttings from metal working machines. The chips are difficult to handle as they are of different lengths and contour, therefore, a separate basket is provided which is perforated on all sides and at the center, as shown in Fig. 2. The chips are placed in this basket, which can be located at any convenient point outside of the machine, and, when filled, can be elevated by hoisting apparatus, the hooks 32 of which engage the bails and, by arranging the hoisting apparatus, the basket can be placed in the cage 20 of the machine and the hooks detached from the bails, the bails, being slotted, can be moved down into position and slightly tilted so as to be below the lid 26, which is then closed as shown in Fig. 1. Steam is admitted to the chamber 6 through one or more nozzles 19 and this steam impinges upon the blades 18 of the cage, causing the cage and basket to turn rapidly. The centrifugal action, together with the steam, causes the oil to be thrown from the chips in the basket, the oil escaping through the perforations in the basket and cage and being discharged through the bottom opening 44; the oil being collected in any suitable manner, while the steam is allowed to escape. After a certain length of time the steam is cut off and the machine is stopped. The lid is raised by turning the hand wheel 39, and the hooks 32 are coupled to the bails 28 and the basket is lifted out of the cage and moved to the discharge point. By merely tilting the basket on the pivots 30, which connect the basket to the bails, the chips can be discharged and the basket reloaded and the operation repeated.

In some instances, air under pressure may be used to turn the cage, if desired.

I claim:—

1. In a machine for separating oil from metal chips and like material, the combination of a casing having an integral central post; a shaft mounted in the post; a perforated cage mounted on the central post and secured to the shaft; means for rotating the cage; a perforated basket removably located within and supported by the cage; bails pivoted to the basket; and means for engaging the bails to lift the basket out of the cage.

2. The combination in a centrifugal machine for separating oil from metal chips and like material, of a casing having an integral post extending centrally therein; a shaft mounted within the post; a perforated cage mounted on the central post and secured to the shaft, said cage having a hub provided with vertical strengthening ribs; a heavy reinforcing ring on the lower periphery of the cage; means for rotating the cage; a removable perforated basket disposed within and supported by the cage; slotted bails on opposite sides of said basket; hoisting means adapted to engage said bails to remove the basket; and a cover for the casing.

In witness whereof I affix my signature.

JOHN W. PITTOCK.